Dec. 29, 1936.  L. GROSSMAN  2,065,935
OPHTHALMIC MOUNTING
Filed Aug. 27, 1935
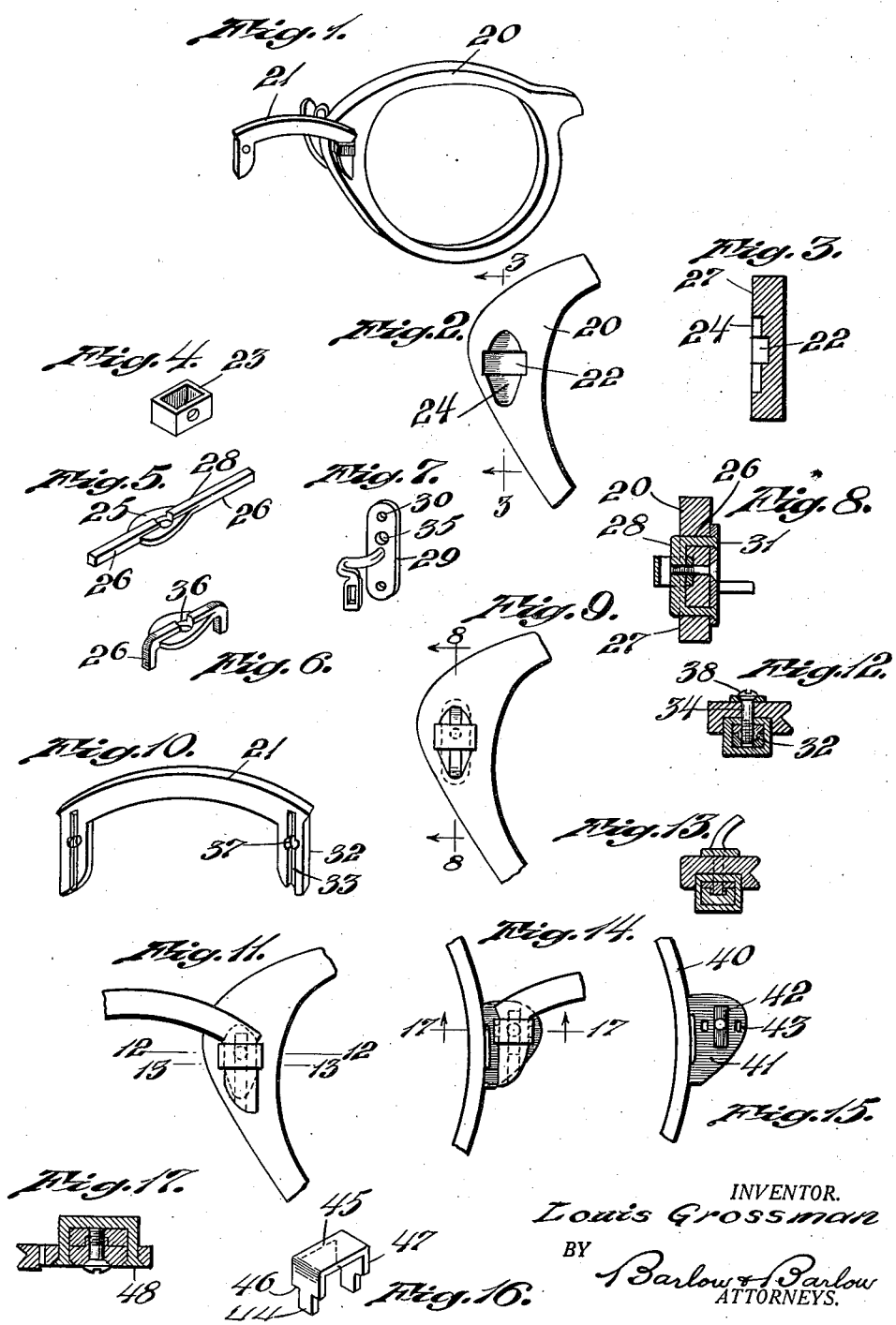
INVENTOR.
Louis Grossman
BY
Barlow & Barlow
ATTORNEYS.

Patented Dec. 29, 1936

2,065,935

UNITED STATES PATENT OFFICE 2,065,935

OPHTHALMIC MOUNTING

Louis Grossman, New York, N. Y., assignor to Optical Products Corporation, a corporation of New York Application August 27, 1935, Serial No. 38,057

13 Claims. (Cl. 88—43)

This invention relates to an ophthalmic mounting, more particularly to removably mounting a bridge between two lens rims; and has for one of its objects an improved means of mounting a bridge on the rims of a lens which will enable it to be readily detached and interchanged with other bridges and yet securely and firmly held in its attached position.

Another object of the invention is the utilization of the surface of the lens rims and the provision of means for guiding the bridge into position and securing it snugly attached to the rims.

Another object of the invention is the utilization of the metal parts in conjunction with a non-metallic lens rim for securing a metallic bridge in position thereon.

Another object of the invention is the provision of means for preventing relative rotation of the lens rims and the arms of the bridge.

Another object of the invention is the utilization of one of the lens rims, should the other break, or the utilization of both lens rims should the bridge break by merely substituting a fresh part for a broken part, each part being of unit formation and of such construction that one may be substituted for the other should injury occur to one of the parts which go to form a complete assembly.

With these and other objects in view, the invention consists of certain novel features of construction, as will be more fully described, and particularly pointed out in the appended claims.

In the accompanying drawing:

Fig. 1 is a front view of the lens rim and bridge shown in mounted position thereon;

Fig. 2 is a front view of a fragmental portion of the rim showing the recesses for portions of my mounting device;

Fig. 3 is a section on line 3—3 of Figure 2;

Fig. 4 is a perspective view of the metal strap;

Fig. 5 is a perspective view of the rib and guide plate;

Fig. 6 shows this plate as bent into position for assembly with the rim;

Fig. 7 is a perspective view of the back plate with the nose pad arm mounted in position;

Fig. 8 is a sectional view through the rim of the assembly of the parts shown in Figures 4 to 7 inclusive;

Fig. 9 is a face view of the assembly showing a fragmental portion of the rim;

Fig. 10 is a perspective view of the bridge;

Fig. 11 is a fragmental view of the bridge and portion of the lens rim, showing the bridge assembled therewith;

Fig. 12 is a section on the line 12—12 of Figure 11;

Fig. 13 is a section on the line 13—13 of Figure 11;

Fig. 14 is a modified view showing a metallic rim and a fragmental portion of the bridge as mounted thereon;

Fig. 15 is an elevation of a fragmental portion showing the rim and ear alone;

Fig. 16 is a perspective view of the strap portion of the assembly of Figure 14;

Fig. 17 is a sectional view on line 17—17 of Figure 14.

In the use of ophthalmic mountings, it is frequently desirable to provide rims for each lens and a separable connecting bridge for joining the rims together so that these bridges may be interchanged to secure different pupillary distances between the lenses, or for providing bridges of different ornamental shapes; and in order that this may be accomplished in a very simple and inexpensive manner, I have provided a tongue and groove connection between the bridge and the rim to positively position the bridge relative to the rim when assembled therewith, and I have provided a strap for guiding the rim and bridge into their relative desired positions and in cases where a non-metallic rim is provided the rib which I form is also provided with integral rivets which may be forced through the rim for securely positioning the rib in place; and the following is a more detailed description of the present embodiment of this invention illustrating the preferred means by which these advantageous results may be accomplished.

With reference to the drawing, 20 designates a non-metallic lens rim such as of zylonite, celluloid or some similar material, and 21 designates the bridge which is to be assembled therewith. The lens rim 20 is provided with a recess 22 for the reception of a strap 23 of generally rectangular formation, such as is clearly shown in Figure 4 of the drawing. The rim is also provided with a cooperating recess 24 for the reception of the positioning member 25, shown in Figure 5, as struck from sheet stock with shank or rivet portions 26 extending from each end thereof.

These portions 26 are bent as shown in Figure 6, while the body portion 25 when fitting in the recess 24 will come flush with the surface 27 of the rim, while the rib 28 will protrude therebeyond to form a guide for a groove in the bridge as will later be described.

In assembly, the strap is first positioned in its recess 22 and then the member 25 after being bent as shown in Figure 6, is positioned in recess 24 by forcing the rivet 26 through the non-metallic material of the rim 20, as shown in Figure 8. A plate 29 (Figure 7) is then positioned with its openings 30 receiving the ends of the rivets 26 which are headed over as at 31 in Figure 8, thus leaving the surface of the member 25 flush with the surface 27 of the rim with the rib 28 projecting beyond and into the pocket formed by the strap 23.

The bridge 21 has arms 32 with grooves 33 therein of a size to snugly fit the rib 28, these arms 32 being of a size to fit into the pocket formed by the strap 23 when the rib extends into the groove 33. Thus this arm 32 is guided into position on the rim 20 where it may be securely held by means of the screw 34 extending through the opening 35 in the plate, opening 36 in the member 25 and into the threaded opening 37 in the bridge arm 32. The screw being headed as at 38 draws the bridge arm 32 snugly against the surface of the rim 20 for binding the parts in position.

By the forcing through of the square rivet shank 26, a very secure and tight fit is provided for the member 25 in the non-metallic rim 20.

In some cases I may have a metallic rim 40 in which case I will solder an ear 41 on the rim, the ear having a rib 42 and also openings 43 for the reception of the rivet portion 44 of the strap 45 formed in U-shape, as shown in Figure 16, with the shoulders 46 of each of the legs 47 of the U so that they will abut against the ear 41, as the ends of the shank 44 are riveted over at 48 in Figure 17, by which construction I provide a rib and a strap to guide the same into position in the same manner as provided in the non-metallic construction and which will equally well receive a bridge 21, as shown in Figure 10, whereby the bridges may be interchanged for adjustment for pupillary distances or for providing different ornamentation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An ophthalmic mounting, comprising a pair of lens rims, a bridge having a body portion with downwardly extending arms, and means for detachably mounting one arm on each rim including a strap extending forwardly at right angles to the plane of said rims and providing an opening into which the arm downwardly extends.

2. An ophthalmic mounting front, comprising a pair of lens rim parts, a metal plate in each rim part each presenting a front surface, the said surfaces of said plates being in a generally common plane, a bridge having a body portion with downwardly-extending arm parts having their rear surfaces located substantially in said common plane, and means for detachably mounting one arm on each rim along the said plate surface thereof, including a groove in one part and a rib on the other part to slide into said groove.

3. An ophthalmic mounting front, comprising a pair of lens rim parts, a metal plate in each rim part each presenting a front surface, the said surfaces of said plates being in a generally common plane and flush with the rim, a bridge having a body portion with downwardly-extending arm parts having their rear surfaces located substantially in said common plane, and means for detachably mounting one arm on each rim, including a groove in one part and a rib on the other part to fit into said groove and means passing through said rib for drawing said rib into said groove.

4. An ophthalmic mounting, comprising a pair of lens rim parts, each presenting a front surface, the said surfaces of said rim parts being in a generally common plane, a bridge having a body portion with downwardly-extending arm parts, means for detachably mounting one arm part on each rim, including a strap extending at substantially right angles forwardly from said surface and providing an opening into which the arm part extends, and a groove in one part and a rib on the other part to slide into said groove.

5. An ophthalmic mounting comprising a pair of lens rim parts, each presenting a front surface, the said surfaces of said rim parts being in a generally common plane, a bridge having a body portion with downwardly-extending arm parts, means for detachably mounting one arm part on each rim part and along the surface thereof, including a strap extending forwardly from said surface and providing an opening into which the arm part extends, a groove in one part and a rib on the other part to slide into said groove, and means passing through said rib for drawing said rib in said groove.

6. An ophthalmic mounting, comprising a pair of lens rim parts, a bridge having a body portion with downwardly extending arm parts, means for detachably mounting one arm part on each rim part, including a vertical groove in one part and a vertical rib on the other part to fit in said groove, said ribbed and grooved parts having aligned openings, one of which is threaded, and a screw located generally in the plane of said rib and extending through the adjacent part and into said openings to hold the parts in assembled relation.

7. An ophthalmic mounting, comprising a pair of lens rims, a bridge having a body portion with downwardly extending arms, means for detachably mounting one arm on each rim, including a strap providing an opening through which the arm extends, said strap being of generally rectangular shape with one part inset into said rim and the remainder projecting outwardly therefrom to freely receive the arms when slid along the surface into which it is inset.

8. An ophthalmic mounting, comprising a pair of lens rims having faces in a generally common plane, a bridge having a body portion with downwardly-extending arms, means for detachably mounting one arm on the face of each rim, including a strap projecting forwardly from said face and providing an opening through which the arm extends, a vertical groove in said bridge arm, and a vertical rib on said rim projecting beyond the said face of said rim and fitting into said groove.

9. An ophthalmic mounting, comprising a pair of lens rims, a bridge having a body portion with downwardly extending arms, means for detachably mounting one arm on each rim including a strap through which the arm extends, a groove in said bridge arm and a member fitting into the rim and flush with the surface thereof, and a rib on said member projecting beyond the surface of said rim and fitting in said groove.

10. An ophthalmic mounting, comprising a pair of lens rims having a front face, a bridge having a body portion with downwardly extending arms, means for detachably mounting one arm on each rim including a strap extending at right angles to the plane of the lens and providing an opening through which the arm extends, and a member extending through said strap and setting into the said face of said rim for holding said strap in place.

11. An ophthalmic mounting, comprising a pair of lens rims having a front face, a bridge having a body portion with downwardly extending arms, means for detachably mounting one arm on each rim including a strap extending at right angles to the plane of the lens and providing an opening through which the arm extends, and a member extending through said strap and setting into the said face of said rim and having integral rivets extending through said rim for holding said strap in place.

12. An ophthalmic mounting, comprising a pair of lens rims, a bridge having a body portion with downwardly extending arms, means for detachably mounting one arm on each rim including a strap through which the arm extends, and a member extending through said strap and setting into the surface of said rim and having integral rivets extending through said rim for holding said strap in place, a plate on the opposite side of said rim through which said rivets extend and over which they are riveted.

13. An ophthalmic mounting comprising a pair of lens rims, each presenting a front surface, the said surfaces of said rims being in a generally common plane, a bridge having a body portion with downwardly-extending arms, means for detachably mounting one arm on each rim and along the surface thereof, including a strap substantially rectangular in plan view extending forwardly from said surface, said strap providing an opening and having a width adapting it to act as a guide into which said arm extends, a groove in one part of said means and a rib on another part to slide into said groove, and means passing through said rib for drawing said rib into said groove.

LOUIS GROSSMAN.